No. 761,842. PATENTED JUNE 7, 1904.
C. LAUKHUFF.
DOUGH TREATING MECHANISM.
APPLICATION FILED SEPT. 8, 1903.
NO MODEL. 3 SHEETS—SHEET 1.

WITNESSES:

INVENTOR
Charles Laukhuff
BY C. W. Mills
Attorney

No. 761,842. PATENTED JUNE 7, 1904.
C. LAUKHUFF.
DOUGH TREATING MECHANISM.
APPLICATION FILED SEPT. 8, 1903.
NO MODEL. 3 SHEETS—SHEET 2.
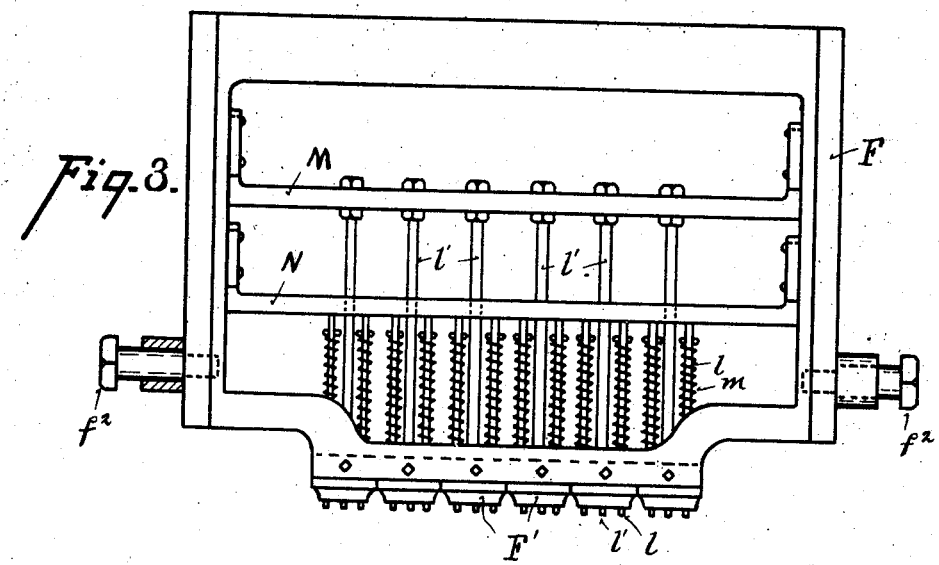
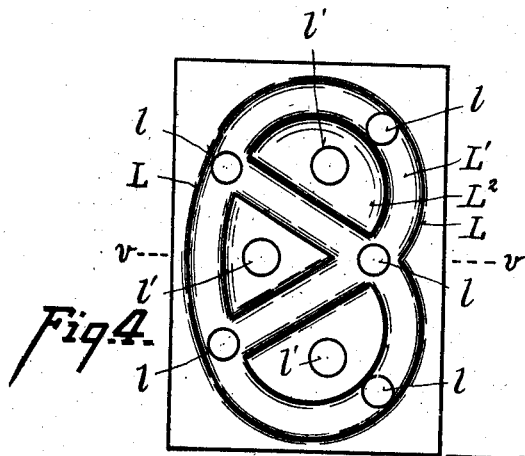
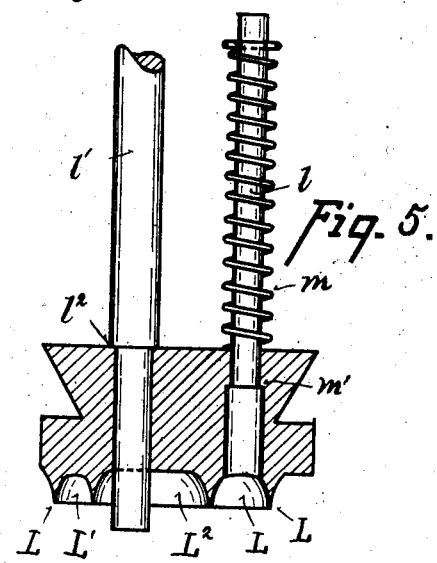
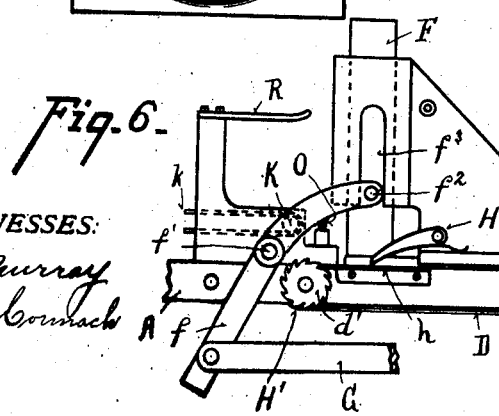
WITNESSES:
INVENTOR
Charles Laukhuff
BY C. W. Miles
Attorney No. 761,842. PATENTED JUNE 7, 1904.
C. LAUKHUFF.
DOUGH TREATING MECHANISM.
APPLICATION FILED SEPT. 8, 1903.
NO MODEL. 3 SHEETS—SHEET 3.
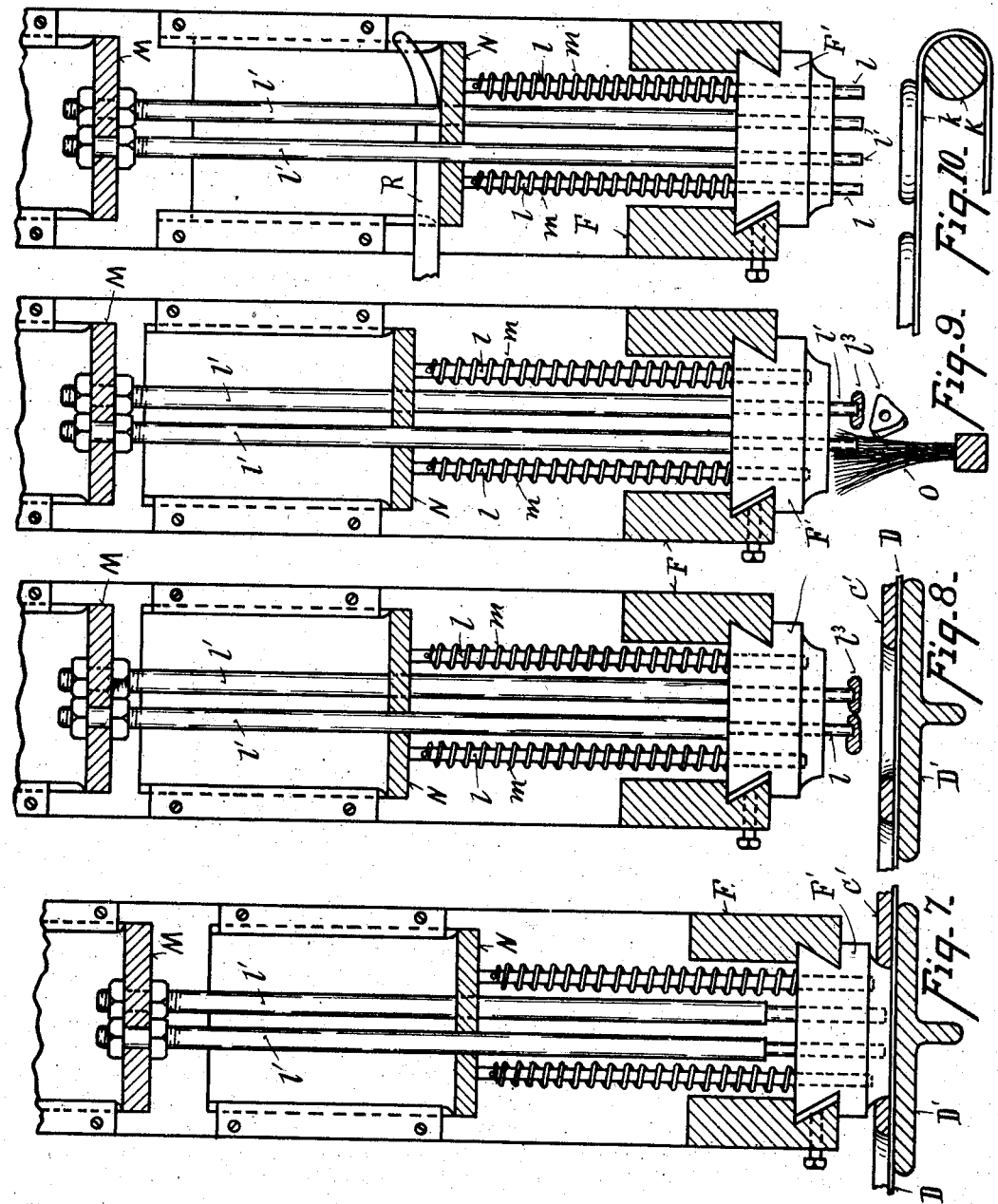
WITNESSES:
H. F. Murray
A. McCormack
INVENTOR
Charles Laukhuff
BY C. W. Miles.
Attorney No. 761,842.

Patented June 7, 1904.

UNITED STATES PATENT OFFICE.

CHARLES LAUKHUFF, OF CINCINNATI, OHIO.

DOUGH-TREATING MECHANISM.

SPECIFICATION forming part of Letters Patent No. 761,842, dated June 7, 1904.

Application filed September 8, 1903. Serial No. 172,283. (No model.)

*To all whom it may concern:*

Be it known that I, CHARLES LAUKHUFF, a citizen of the United States, residing at Cincinnati, in the county of Hamilton and State of Ohio, have invented certain new and useful Improvements in Dough-Treating Mechanism; and I do hereby declare the following to be a full, clear, and exact description of the invention, such as will enable others skilled in the art to which it appertains to make and use the same.

My invention relates to improved mechanism for forming pretzels and similar articles. One of its objects is to provide mechanism adapted to successfully operate on what is known as "soft" dough.

Another object is to provide improved mechanism for freeing the articles from scrap dough.

Another object is to provide mechanism for forming a continuous sheet and to automatically cut, separate, and feed the articles cut therefrom upon drying-boards.

It further consists in certain details of form, combination, and arrangement, all of which will be more fully set forth in the description of the accompanying drawings, in which—

Figure 1:
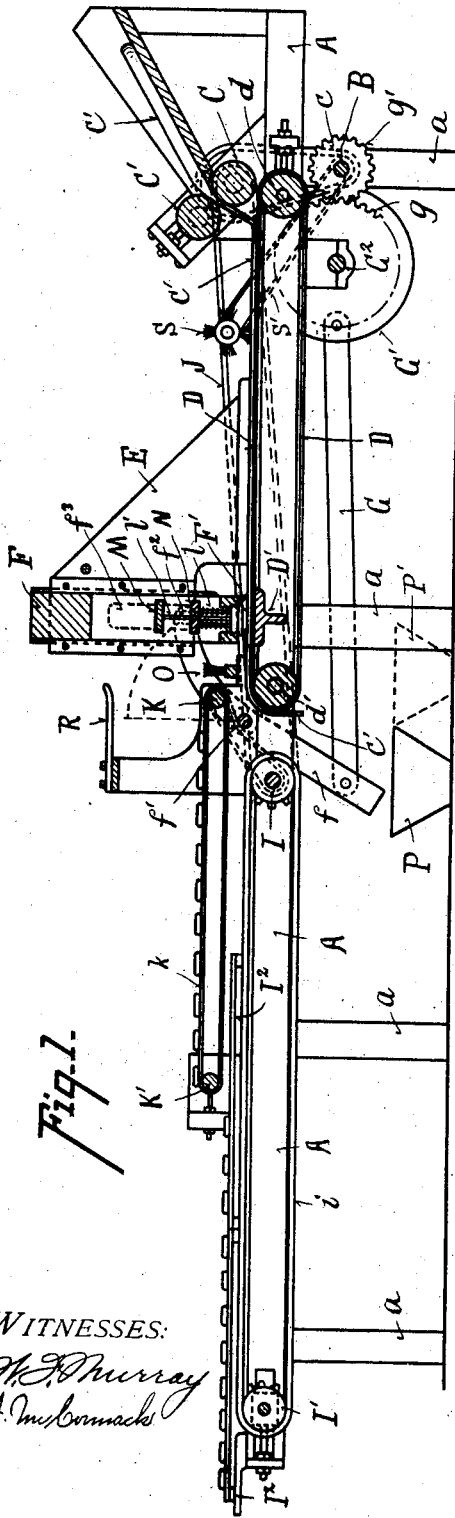
Figure 2:
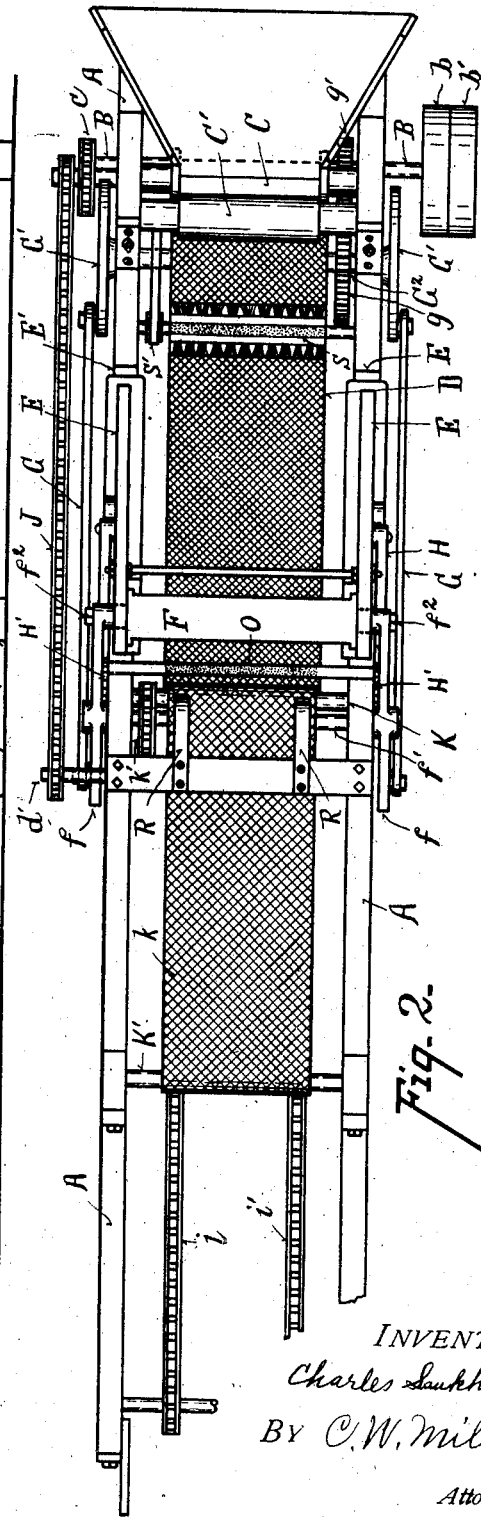

Figure 1 is a central longitudinal section through my improved mechanism. Fig. 2 is a top plan view of the same. Fig. 3 is a plan view of the frame carrying the dies. Fig. 4 is a bottom plan view of one of the dies. Fig. 5 is a section through the same on line $v$ $v$ of Fig. 4. Fig. 6 is a detail side elevation of the die-frame and apron feeding mechanism. Figs. 7, 8, 9, and 10 are sectional details through the die-frame, showing the successive movement of the parts.

While hard or stiff dough, such as is employed for making crackers, has been heretofore stamped or cut into shape by means of dies operated mechanically, such mechanism have failed to operate successfully upon soft doughs which are to be subsequently raised, such as are employed in making pretzels and similar articles, and therefore such articles have been heretofore produced by hand. With mechanism of the character here illustrated I am enabled to continuously and successfully operate upon such soft doughs.

A represents the frame of the machine, supported upon legs $a$.

B represents the driving-shaft, having tight and loose pulleys $b$ $b'$.

C C' represent feed-rolls geared together and receiving motion from the driving-shaft, preferably by means of a chain belt $c$. The roll C' is adjustable to or from roll C in order to regulate the thickness of the sheet of dough $c'$, which after passing rolls C C' falls upon an endless belt or apron D, preferably of canvas, passing over the rolls $d$ $d'$, the roll $d$ being adjustable in order to regulate the tension of the apron.

D' represents a platen over which the apron passes.

E represents a frame mounted upon ways E' on the side bars of frame A and adapted to slide horizontally along said ways.

F represents the die-frame, which is mounted to slide vertically in ways in the frame E.

F' represents the dies, which are secured side by side in a dovetailed groove in the lower part of the die-frame.

$f$ represents rocker-arms, secured upon a shaft $f'$. These arms, one at each side of the machine, are pivoted by bolts $f^2$ to the die-frames, slots $f^3$ being formed in the frame E for the passage of said bolts. The opposite ends of the rocker-arms are connected by links G to crank-wheels G' on shaft $G^2$, which shaft is driven by means of gears $g$ $g'$ from the driving-shaft, so that at each revolution of the crank-wheels the rocker-arms cause the frame E to reciprocate horizontally and the die-frame to reciprocate vertically therein. Spring-pawls H, carried by frame E, engage ratchet-wheels H' on the shaft of roll $d'$ to feed the apron D forward one step at each forward movement of the frame E.

$h$ represents shelves on the frame A to support the ends of the pawls when not in engagement with the ratchet-wheels.

I I' represent shafts connected by chain-belts $i$ $i'$, upon which are placed drying-boards $I^2$. Motion is imparted to shaft I by means of a chain belt J from the shaft of roll C to slowly feed the boards forward, empty boards being placed upon the chain belts and the full boards being removed and stacked together to dry and permit the dough to rise.

K K' represent shafts or rolls supporting an apron $k$, upon which the dies deposit the articles. This apron is fed slowly forward by means of a chain $k'$, receiving power from shaft I. The articles after being deposited from the dies on apron $k$ are fed slowly along and finally dropped in regular order upon the boards $I^2$.

In Figs. 4 and 5 I have shown a die adapted to form pretzels; but the dies may be adapted to form articles of any desired shape. The die is provided with edges L sufficiently sharp to cut through the dough.

L' represents the recess to be occupied by the article to be formed, and $L^2$ the spaces to be occupied by the parts to be cut out of the article to be formed.

$l$ represents spring-actuated rods or plungers, which serve to push the finished article out of the dies, and $l'$ rods or plungers which serve to push out the pieces to be cut from the articles.

M represents a cross-bar, preferably sliding in ways on the die-frame and to which all the plungers $l'$ are attached, the said plungers passing up through holes in the cross-bar N, which also preferably slides in ways in the die-frame and contacts with the upper ends of the plungers $l$. The plungers $l'$ normally rest, by means of shoulders $l^2$, upon the upper face of the dies and with their lower ends projecting below the face of the dies. The plungers $l$ are normally held up within the dies by means of the springs $m$, being provided with shoulders $m'$ to limit their upward movement.

In operation the dies descend substantially vertically upon the sheet of dough, the dough and apron being supported by the platen D'. The plungers $l'$ first strike into the dough and to a certain extent become attached thereto. As the dies descend farther the lower ends of plungers $l'$ recede into the recesses $L^2$, being pressed upward by the dough and apron, and the dies descend, so as to cut through the sheet of dough, thereby filling the recesses L' $L^2$ with dough. As the dies commence to rise the plungers $l'$ detach the dough from the recesses $L^2$ and pin or hold it to the apron until the pieces of dough $l^3$ are completely detached from the dies. As the dies continue to rise the plungers $l'$ finally seat at shoulders $l^2$ on the dies and are lifted with the dies, carrying the pieces $l^3$ with them, as indicated in Fig. 8. The dies now, due to the combined movement of frames E F, describe the arc of a circle, as indicated by dotted lines, Fig. 1, so as to bring the dies above the forward end of apron $k$. During this movement the ends of plungers $l'$ come in contact with and pass across a brush O, which detaches the pieces $l^3$ and allows them to drop down over the end of the apron D, so as to fall into a box P, placed beneath the machine. The portion of the sheet of dough from which the articles have been cut may also be led into the box P or, if desired, into a separate box P', from which it is gathered and used again. As the dies reach the limit of their movement and attain a position above the apron $k$ the cross-bar N is brought into contact with the projecting fingers R, which depress the cross-bar relative to the dies, which forces down the plungers $l$, thereby detaching the articles from the recesses L' in the dies, so that they drop upon the apron and are thence carried to the drying-boards.

A brush S is preferably journaled to revolve and brush the upper face of the sheet of dough, being driven by belt S', so that by placing flour upon the sheet it is dusted evenly over the top of the sheet and serves to form a dry surface or skin which tends to prevent the dough sticking in the dies. The pawl H and ratchet-wheel H' serve to feed the apron D forward in a step-by-step movement at a period when the dies are lifted from the apron.

The mechanism herein illustrated and described is capable of considerable modification without departing from the principle of my invention.

Having described my invention, what I claim is—

1. In a dough-treating mechanism, a pair of feed-rolls, an apron having a step-by-step movement, an apron to receive the finished articles, and one or more dies traveling from one to the other of said aprons, and adapted to cut the articles from the sheet of dough on one apron and deposit the articles upon the other apron.

2. In a dough-treating mechanism, a pair of feed-rolls, an apron having a step-by-step movement, an apron to receive the finished articles, a conveyer to feed the drying-boards, and one or more dies traveling from one to the other of said aprons, and adapted to cut the articles from the sheet of dough on one apron and deposit the articles upon the other apron.

3. In a dough-treating mechanism, an apron having a step-by-step movement, a receiver for the finished articles, a horizontally-traveling frame, a vertically-traveling die-frame mounted on and carried by said horizontally-traveling frame, and means for reciprocating said frames.

4. In a dough-treating mechanism, an apron having a step-by-step movement, an apron to receive the finished articles, a horizontally-traveling frame, a vertically-moving die-frame mounted on and carried by said horizontally-traveling frame, and means for reciprocating said frames.

5. In a dough-treating mechanism, a sheet-feeding apron, a receiver for the finished articles, a horizontally-traveling frame, a vertically-traveling die-frame, and means connected with said horizontally-traveling frame for feeding the sheet-feeding apron in a step-by-step movement.

6. In a dough-treating mechanism, a sheet-feeding apron, a receiver for the finished articles, one or more dies adapted to cut out and retain the articles to be formed, mechanism for moving said dies from the apron to the receiver, and means for disengaging said articles from the dies and depositing the same upon the receiver.

7. In a dough-treating mechanism, a pair of feed-rolls to continuously form a sheet of dough, an apron having a step-by-step movement, a receiver for the finished articles, one or more traveling dies to cut the articles from the sheet of dough at one point of the die movement, and positively-operated mechanism to detach the articles from the dies and deposit them on the receiver at another point of the die movement.

8. In a dough-treating mechanism, a sheet-feeding apron, a receiver for the finished articles, a die having a recess to receive the article, and a recess to receive the part to be trimmed therefrom, mechanism adapted to first detach the dough from one of said recesses, and to afterward detach the dough from the other recess, and means for actuating said mechanism at proper intervals.

9. In a dough-treating mechanism, a reciprocating die-frame, one or more dies adapted to cut the articles from a sheet of dough at one end of the die movement, and to carry the article so cut out to a receiver, and trip-fingers to contact with the dies and detach and deposit the articles upon the receiver.

10. In a dough-treating mechanism, a reciprocating die-frame, one or more dies adapted to cut the articles from a sheet of dough at one end of the die movement, and to cut sections from the body of said articles, mechanism for first detaching the sections so cut from the articles, and finally detaching the articles from the dies.

11. In a dough-treating mechanism, a reciprocating die-frame, one or more dies adapted to cut the articles from a sheet of dough at one end of the die movement, and to cut sections from the articles, mechanism for detaching the sections so cut from the articles at one point of the die movement, and for detaching the articles at a different point of the die movement.

12. In a dough-treating mechanism, a reciprocating die-frame, one or more dies adapted to cut the articles from a sheet of dough at one end of the die movement, and to cut sections from the body of said articles, automatically-operated plungers adapted to first detach the sections so cut from the articles, and automatically-operated plungers to finally detach the articles from the dies.

13. In a dough-treating mechanism, a reciprocating die-frame, one or more dies adapted to cut the articles from a sheet of dough at one end of the die movement, and to cut sections from the articles, automatically-operated plungers for detaching the sections so cut from the articles at one point of the die movement, and automatically-operated plungers for detaching the articles at a different point of the die movement.

14. In a dough-treating mechanism, a reciprocating die-frame, one or more dies adapted to cut the articles from a sheet of dough at one end of the die movement, and to cut sections from the body of said articles, plungers normally projecting through the recesses in the dies which receive the sections, and with their lower ends below the face of the dies, plungers normally retracted into the recesses of the dies which receive the articles, a brush adapted to detach the sections at one point of the die movement from the projecting ends of the plungers, and means for afterward depressing the normally retracted plungers to detach the articles.

In testimony whereof I have affixed my signature in presence of two witnesses.

CHARLES LAUKHUFF.

Witnesses:
C. W. MILES,
CHR. LAUKHUFF.